US009519955B2

(12) United States Patent
Stauder et al.

(10) Patent No.: US 9,519,955 B2
(45) Date of Patent: Dec. 13, 2016

(54) METHOD OF EMBEDDING OF AN IMAGE WITH A COLOR TRANSFORM

(71) Applicant: THOMSON LICENSING, Issy de Moulineaux (FR)

(72) Inventors: Jurgen Stauder, Montreuil/Ille (FR); Frederic Lefebvre, Rennes (FR); Patrick Morvan, Laille (FR)

(73) Assignee: THOMSON LICENSING, Issy les Moulineaux (FR)

( * ) Notice: Subject to any disclaimer, the term of this patent is extended or adjusted under 35 U.S.C. 154(b) by 4 days.

(21) Appl. No.: 14/538,780

(22) Filed: Nov. 11, 2014

(65) Prior Publication Data

US 2015/0139544 A1 May 21, 2015

(30) Foreign Application Priority Data

Nov. 15, 2013 (EP) .................................... 13306570

(51) Int. Cl.
*G06K 9/00* (2006.01)
*G06T 5/00* (2006.01)
(Continued)

(52) U.S. Cl.
CPC .................. *G06T 5/002* (2013.01); *G06T 5/50* (2013.01); *G06T 7/0002* (2013.01); *G09G 5/06* (2013.01);
(Continued)

(58) Field of Classification Search
CPC ...... H04N 9/67; H04N 19/115; H04N 19/117; H04N 19/12; H04N 19/147; H04N 19/149; H04N 19/15; H04N 19/154; H04N 19/172; H04N 19/182; H04N 19/184; H04N 19/186; H04N 19/19; H04N 19/196; H04N 19/30; H04N 19/48; H04N 19/51; H04N 19/59; H04N 19/61; H04N 19/86; G06T 5/002; G06T 5/50; G06T 7/0002; G06T 7/2013; G06T 9/004; G06T 2207/10016; G09G 5/06; G09G 2340/02; G09G 2340/06; G09G 2350/00; G09G 2370/022
See application file for complete search history.

(56) References Cited

U.S. PATENT DOCUMENTS 6,519,365 B2 2/2003 Kondo et al.
2009/0168894 A1 7/2009 Marpe et al.
(Continued)

FOREIGN PATENT DOCUMENTS

JP 2008271411 11/2008
WO WO2012122421 9/2012

OTHER PUBLICATIONS

Van Dyck etal :"Subband/VQ Coding of Color Images With Perceptually Optimal Bitallocation", IEEE Transactions on Circuits and Systems for Video Technology, vol. 4, No. 1, Feb. 1, 1994, pp. 68-82.
(Continued)

*Primary Examiner* — Jose Couso
(74) *Attorney, Agent, or Firm* — Tutunjian & Bitetto, P.C.

(57) ABSTRACT

The method comprises the generation of a deteriorated image associated with a first bit rate and of a deteriorated color transform associated with a second bit rate, an evaluation of a first distortion by comparison of the image with a first test image obtained by the application of the color transform to the deteriorated image, and of a second distortion by comparison of the image with a second test image obtained by the application of the deteriorated color transform to the image, and the determination of a final conjoint bit rate associated with a best trade-off between a conjoint bit rate (R=R1+R2) and a global distortion (dE=dE1+DE2).

(Continued)

The optimized deteriorated image and the optimized deteriorated color transform are then embedded based on this conjoint bit rate.

7 Claims, 3 Drawing Sheets

(51) Int. Cl.
<table>
<tr><td>G09G 5/06</td><td>(2006.01)</td></tr>
<tr><td>H04N 9/67</td><td>(2006.01)</td></tr>
<tr><td>H04N 19/147</td><td>(2014.01)</td></tr>
<tr><td>H04N 19/172</td><td>(2014.01)</td></tr>
<tr><td>H04N 19/154</td><td>(2014.01)</td></tr>
<tr><td>H04N 19/192</td><td>(2014.01)</td></tr>
<tr><td>H04N 19/48</td><td>(2014.01)</td></tr>
<tr><td>H04N 19/86</td><td>(2014.01)</td></tr>
<tr><td>G06T 5/50</td><td>(2006.01)</td></tr>
<tr><td>G06T 7/00</td><td>(2006.01)</td></tr>
<tr><td>H04N 19/12</td><td>(2014.01)</td></tr>
</table>

(52) U.S. Cl.
CPC .............. *H04N 9/67* (2013.01); *H04N 19/147* (2014.11); *H04N 19/154* (2014.11); *H04N 19/172* (2014.11); *H04N 19/192* (2014.11); *H04N 19/48* (2014.11); *H04N 19/86* (2014.11); *G09G 2340/02* (2013.01); *G09G 2340/06* (2013.01); *G09G 2350/00* (2013.01); *G09G 2370/022* (2013.01); *H04N 19/12* (2014.11)

(56) References Cited

U.S. PATENT DOCUMENTS

| | | |
|---|---|---|
| 2009/0175338 A1 | 7/2009 | Segall |
| 2010/0232691 A1 | 9/2010 | Sekiguchi et al. |
| 2012/0301016 A1 | 11/2012 | Zhu et al. |

OTHER PUBLICATIONS

Suzuki: "Proposal to support UHDTV colorimetory"; 10-JCT-VC Mtg; 101-MPEG Meeting; Jul. 7-20, 2012, p. 2-4; p. 6-7; Table E-10-9; p. 8, Table E10-10; p. 11-12, Table E-10-11.

Gershikov etal: "On a Rate-Distortion Model for Color Images using a Correlation-Based Approach"; 2006 IEEE 24th Convention of Electrical . . . : pp. 105-109.

Marpe et al: "Macroblock-Adaptive Residual Color Space Transforms for 4:4:4 Video Coding", 2006 IEEE Int'l Conference on Image Processing; pp. 3157-3160.

Marpe et al: "An Adaptive Color Transform Approach and its Application in 4:4:4 Video Coding"; Proc. 14th European Signal Processing Conf. (EUSIPCO 2006); Sep. 2006: pp. 1-5.

Ortega et al: "Rate-Distortion Method for Image and Video Compression"; IEEE Signal Processing Magazine; vol. 15, issue 6: Nov. 1998, pp. 23-25.

Salomon: "Data Compression, The Complete Reference"; 4th edition, 2007.

Search Report dated Mar. 13, 2014.

Kim et al., "Rate-distortion optimization of the image compression algorithm based on the warped discrete cosine transform", Signal Processing, vol. 83, No. 9, Sep. 2003, pp. 1919-1928.

Kwon et al., "Rate Control for H.264 Video With Enhanced Rate and Distortion Models", IEEE Transactions on Circuits and Systems for Video Technology, vol. 17, No. 5, May 2007, pp. 517-529.

METHOD OF EMBEDDING OF AN IMAGE WITH A COLOR TRANSFORM

This application claims the benefit, under 35 U.S.C. §119 of European Patent Application No. 13306570.6, filed Nov. 15, 2013.

TECHNICAL FIELD

The invention concerns a method and a system for embedding a color transform into a color image while optimizing bit depth and distortion of these data in order to transmit or store them together by taking the best advantage of the transmission or storing capabilities.

BACKGROUND ART

When transmitting images from an emitter (as a server) to a terminal (as a gateway), or when storing images on a storage device, transmitting and/or storing a color transform together with these images is sometimes required. Color transforms need to be applied to images, videos or parts of images, notably when the color coordinates representing colors in these images need to be adapted to another color encoding standard (colorimetric color management), to another color gamut (color gamut mapping), to another viewing conditions (color appearance) or to another artistic intent (color grading). A color transform can modify the hue, the saturation, the white balance, the black value, the contrast, the white level, or other aspects of an image. If such a color transform is not inherently available at the place (ex. gateway) where the images should be color transformed, the color transform need to be transmitted to this place, notably together with the images to be transformed. In the following, this place is called terminal. Such a terminal may be for instance a gateway, a TV set, a tablet or a smartphone. Images and related color transforms are often from the same origin, i.e. from the same emitter. For example, a video on demand service provides images and a related color transform that both are transmitted to a terminal where the color transform is applied to the images before being displayed. In another example, images are exchanged between different post-production facilities. Each image has an associated color transform adapted to display it on a given reference display device having its own color characteristics.

When images and color transforms have to be transmitted together to a terminal, or stored on a storage device, means adapted for their transmission (data channels, files) or storage and sufficient capacity (channel data rate, file system size) are required. This invention addresses a series of situations where the use of color transforms is normally prohibited. In a first situation, an image transmission channel is not adapted to transmit color transform. For example, in a HDMI interface, videos and various metadata can be transmitted, but the specification of the HDMI standard does not include the notion of a color transform. In a second situation, a storage system is not adapted to store color transforms. For example, a video asset management system for video production or at home in a home network does not include the notion of color transform, i.e. video images can be stored in files and retrieved, but no color transform can be stored together with these videos. In a third situation, a proprietary, open system for storage and transmission of videos comprises means implemented to store and to transmit color transforms together with videos, but, for the reason of disc storage shortage and/or limited bandwidth of transmission channels, the storage and/or transmission of color transforms is prohibited.

In a situation of limited bandwidth for transmission of video images or of limited storage capacity for video images, several methods are known to compress the data representing these images in order to match these limitations. In order to control the quality of the received or stored images, the so-called rate-distortion principle is generally used that relates an increasing data rate (less compression) with a decreasing distortion (better quality). It is known how to apply rate distortion theory to efficiently compress images and videos. For example, A. Ortega gives an introduction in his article entitled "Rate-distortion methods for image and video compression" published in the Signal Processing Magazine of the IEEE, volume 15, issue 6, in November 1998.

Compression and transmission of color transforms is a newer field. A color transform can be represented by a Color Look Up Table (CLUT), by a splines-based model, by a Gain-Offset-Gamma (GOG) model or by any other parametric model. For a CLUT for example, the quality of the data representing the color transform can be controlled by the number of CLUT entries. The larger is the number of entries, i.e. the larger is the rate of data, the lower are the approximations of the CLUT, i.e. the lower is the distortion of these data.

There are known methods for image compression employing a color transform. For example, Marpe et al. propose in their publication entitled "AN ADAPTIVE COLOR TRANSFORM APPROACH AND ITS APPLICATION IN 4:4:4 VIDEO CODING" published in the Proc. 14th European Signal Processing Conference (EUSIPCO 2006), Florence, Italy, September 2006, a method to choose one color transform of an image out of a set of given color transforms such that compression of this image yields best rate with minimum distortion is disclosed. In this article, the color transform is applied before image compression. Practically, the index of the chosen color transform would be needed to be stored or transmitted in order to allow correct decoding of the compressed image.

This invention presents a specific method to embed a color transform into an image or a video in a context where the color transform is applied after image compression and decoding.

Known methods exist for embedding data into images, for instance data hiding techniques such as watermarking. These methods are usually used for copy and copyright protection. The aim of image watermarking is to embed, in a secure way, a robust and not perceptive message (such as Gaussian noise) in an image. Even if, in such methods, the data inserted in the compressed images may be themselves compressed, there is no relationship between the compression of images and the compression of the data.

SUMMARY OF INVENTION

This invention aims at embedding data representing a color transform into the images that have to be transformed while controlling globally the distortion generated by both compressions, i.e. compression of data and compression of images.

When looking at conjoint compression and transmission of images and color transforms from a server to a terminal, two specific rate-distortion characteristics can be observed:

the quality (distortion) of color transforms influences the quality (distortion) of the images since each color transform is applied to the images by the terminal;

the data rate required for the color transforms influences the quality of the images, too, since the color transforms are embedded into the image.

It is an artistic decision in content creation, how many color transforms are associated to how many images.

For this purpose, a first aspect of the invention provides a method of embedding of at least one original image with at least one original color transform, comprising:

from at least said original image, a generation of a deteriorated image associated with a first bit rate, from at least said original color transform, a generation of a deteriorated color transform associated with a second bit rate, an application of said original color transform to said deteriorated image resulting in a first test image, an application of said deteriorated color transform to said original image resulting in a second test image, an evaluation of a first distortion by comparison of the first test image with the original image, an evaluation of a second distortion by comparison of the second test image with the original image, an evaluation of a conjoint bit rate from a summation of the first bit rate with the second bit rate, an evaluation of a global distortion from a weighted summation of the first distortion with the second distortion, if a predetermined trade-off between said conjoint bit rate and said global distortion is met, then determining the final conjoint bit rate associated with the best trade-off, if said predetermined trade-off is not met, then choosing new values of said first bit rate and/or said second bit rate such that a new conjoint bit rate evaluated from a summation of this new first bit rate with the new second bit rate is inferior to the previous conjoint bit rate, and going to another loop of steps above with said new first bit rate and said new second bit rate, as soon as said final conjoint bit rate associated with said best trade-off is determined, inferring the values of the final first bit rate and of the final second bit rate the summation of which corresponds to said final conjoint bit rate in a previous loop of the steps above, and embedding the deteriorated image associated with this final first bit rate in said previous loop with the deteriorated color transform associated with this final second bit rate in the same previous loop.

For this purpose, a second aspect of the invention provides a method of embedding at least one original image with at least one original color transform, comprising:

A/ generation, from at least said one original image, of a deteriorated image associated with a first bit rate, B/ generation, from at least said one original color transform, of a deteriorated color transform associated with a second bit rate, C/ application of said at least one original color transform to said deteriorated image to obtain a first test image, D/ application of said deteriorated color transform to said original image to obtain a second test image, E/ obtaining a first distortion by comparison of the first test image with the original image, F/ obtaining a second distortion by comparison of the second test image with the original image, G/ obtaining a conjoint bit rate from a summation of the first bit rate with the second bit rate, H/ obtaining a global distortion from a summation of the first distortion with the second distortion, said summation being optionally weighted, then, a tradeoff between the conjoint bit rate and the global distortion being determined, in the case where said trade-off is met, determining a final conjoint bit rate associated with said trade-off, otherwise in the case where said trade-off is not met, selecting new values of said first bit rate and/or said second bit rate such that a new conjoint bit rate obtained from a summation of said new first bit rate, if any, or previous first bit rate, if no new first bit rate is selected, with said new second bit rate, if any, or previous second bit rate, if no new second bit rate is selected, is inferior to the previous conjoint bit rate, and repeating a loop of steps A/ to H/ with said new first bit rate and/or said new second bit rate, when said final conjoint bit rate associated with said trade-off is determined, inferring the values of the final first bit rate and of the final second bit rate such that the summation of the final first bit rate and of the final second bit rate corresponds to said final conjoint bit rate from a previous loop of steps A/ to H/, and embedding the at least one deteriorated image associated with said final first bit rate from said previous loop with the deteriorated color transform associated with said final second bit rate from the same previous loop.

The original color transform is adapted to transform the colors of the original image. Such colors are generally encoded into M color coordinates $C(1) \ldots C(M)$, each color coordinate being for instance expressed in N bits. If such an image comprises K pixels, the bit rate associated with the original image is then $K \times M \times N = R_0 1$.

The original color transform is generally represented by a color lookup table—CLUT—having P entries, where each entry has for instance a bit rate of Q bits. Then, the bit rate associated with the original color transform is then $P \times M \times Q = R_0 2$.

Preferably, said color transforms are Color Look Up Tables (CLUT).

Preferably, said generation of a deteriorated color transform is obtained by reducing the bitdepth of the original color transform. Then, the second bit rate associated with the deteriorated color transform is inferior to the bitdepth of the original color transform.

In a first variant, said generation of a deteriorated image is obtained by embedding said original image with said deteriorated color transform.

Preferably, said first bit rate associated with said deteriorated image results from an encoding of this deteriorated image.

In a second variant, said generation of a deteriorated image is obtained by reducing the bitdepth of the original image. Then, the first bit rate associated with the deteriorated image is inferior to the bitdepth of the original image.

A third aspect of the invention provides a system for embedding of at least one original image with at least one original color transform, comprising:

an image generator configured to generate a deteriorated image associated with a first bit rate from at least said original image, a color transform generator configured to generate a deteriorated color transform associated with a second bit rate from at least said original color transform, means for applying said original color transform to said deteriorated image resulting in a first test image, means for applying said deteriorated color transform to said original image resulting in a second test image, means for evaluating a first distortion by comparison of the first test image with the original image, means for evaluating a second distortion by comparison of the second test image with the original image, means for evaluating a conjoint bit rate from a summation of the first bit rate with the second bit rate, means for evaluating a global distortion from a weighted summation of the first distortion with the second distortion, means for determining the final conjoint bit rate associated with the best trade-off when a predetermined trade-off between said conjoint bit rate and said global distortion is met, means for choosing new values of said first bit rate and/or said second bit rate such that a new conjoint bit rate evaluated from a summation of this new first bit rate with the new second bit rate is inferior to the previous conjoint bit rate, when said predetermined trade-off is not met, means for redirecting to the image generator and to the color transform generator when said predetermined trade-off is not met, with said new first bit rate and said new second bit rate, means for inferring the values of the final first bit rate and of the final second bit rate the summation of which corresponds to said final conjoint bit rate when a predetermined trade-off between said conjoint bit rate and said global distortion is met, means for embedding the deteriorated image associated with this final first bit rate with the deteriorated color transform associated with this final second bit rate.

The advantages of embodiments of the invention are notably:

an optimization of image quality after color transformation, including the minimization of the distortion caused by embedding a color transform.

an optimization of color transform precision, i.e. optimization of image quality gained by applying the color transform.

a control of rate, as the invention can indicate explicitly how much information of the image should be replaced—in the sense of information theory—by information related to the color transform in order to obtain an optimal quality.

BRIEF DESCRIPTION OF DRAWINGS

The invention will be more clearly understood on reading the description which follows, given by way of non-limiting example and with reference to the appended figures in which.

DESCRIPTION OF EMBODIMENTS

It will be appreciated by those skilled in the art that the diagrams presented on the figures represent conceptual views of illustrative circuitry embodying the invention. It may be substantially represented in computer readable media and so executed by a computer or processor, whether or not such computer or processor is explicitly shown. The functions of the various elements shown in the figures may be provided through the use of dedicated hardware as well as hardware capable of executing software in association with appropriate software.

In a main non-limiting embodiment, the system used to implement the invention comprises:

a server configured to provide original images and related original color transforms, to process these original images and related original color transforms into final deteriorated images and related final deteriorated color transforms, and to embed together these final deteriorated images and related final deteriorated color transforms, a transmitter for transmitting the embedded final deteriorated images and related final deteriorated color transforms, a terminal configured to receive the embedded final deteriorated images and related final deteriorated color transforms, and to apply each received color transform on each associated received image in order to color transform this image.

The server includes any usual storing and processing means, as those based on a CPU connected through a bus to memories and usual peripherals as a monitor. This server includes also software dedicated to the processing and to the embedding of images and related color transform.

The transmitter could be wireless, as for instance based on a Wi-Fi network having a node included in the server and a node included in the terminal.

The terminal could be a gateway connected for instance to a TV set, or could be a TV set itself. As the server, the terminal also includes at least one processor configured to perform operations in accordance with embodiments of the invention In a main non limiting embodiment of the method according to the invention implemented, for example, on the above system and described with reference to FIG. 1, original images and related original CLUTs representing color transforms are stored on the server.

Figure 1:
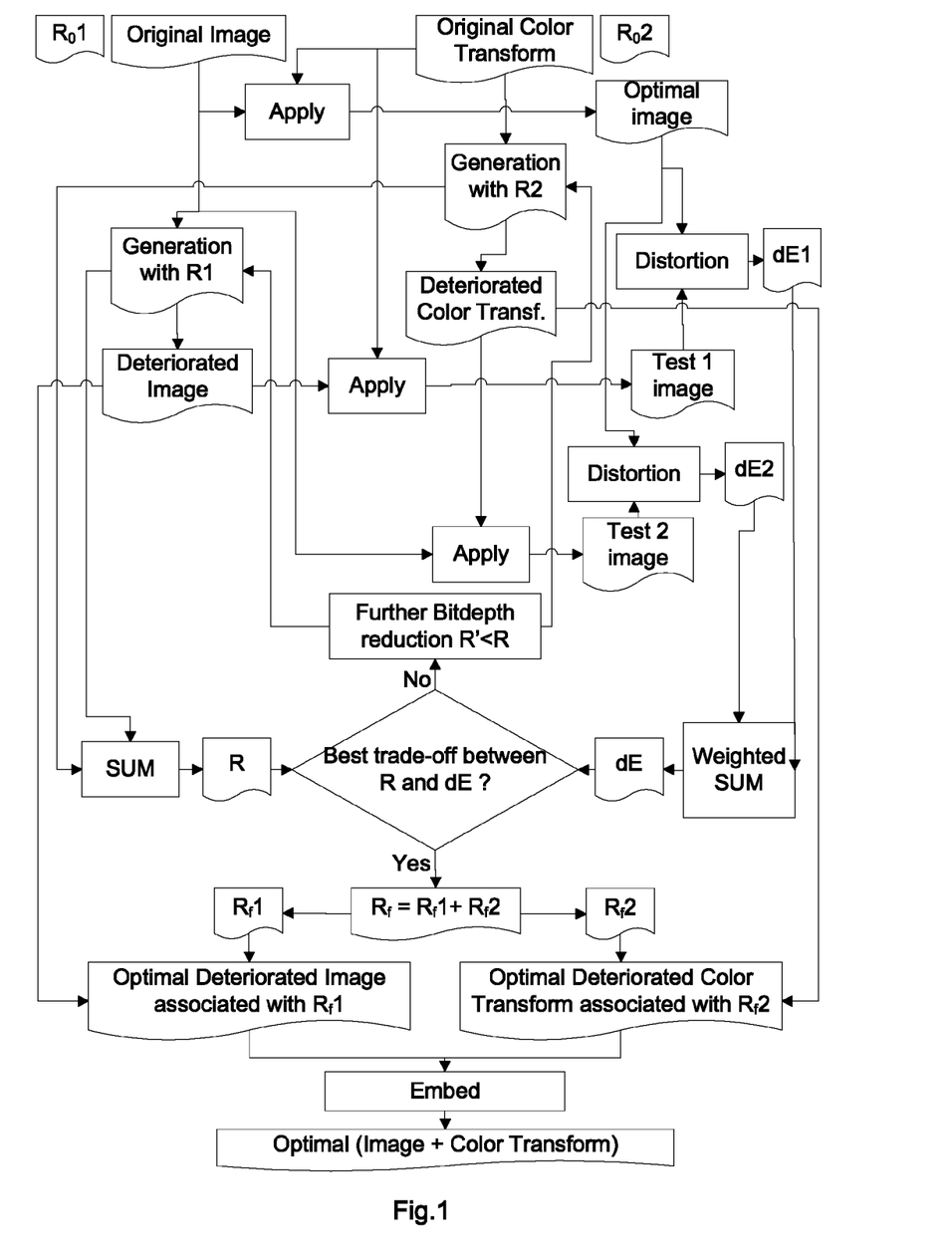
FIG. 1 is a diagram illustrating a method of embedding an original image with an original color transform according to a main embodiment of the invention.

Each original image comprises K pixels; the colors of each pixel are encoded into M color coordinates $C(1) \ldots C(M)$, wherein M is generally equal to 3; each color coordinate is expressed in N bits, for instance 8 bits. Therefore, the bit rate associated with each original image is $K \times M \times N = R_o1$.

Each original image is associated with an original color transform which is adapted to transform the colors of this original image; a plurality of original images are generally associated to the same original color transform; this original color transform is represented by a color lookup table—CLUT—having P entries, where each entry has for instance a bit rate of Q bits. Then, the bit rate associated with the original CLUT is $P \times M \times Q = R_o2$.

For each original image stored on the server, a deteriorated image having a first bit rate $R1 < R_o1$ is generated, and/or, for the original CLUT stored on the server and associated with this original image, a deteriorated CLUT having a second bit rate $R2 < R_o2$ is generated. Such generations are implemented on the server using dedicated software.

Then, when a deteriorated image is generated, this original CLUT is applied to the deteriorated image resulting in a first test image, and, when a deteriorated CLUT is generated, this deteriorated CLUT is applied to the original image resulting in a second test image. Such applications are implemented on the server using other dedicated software.

Then, using still other dedicated software, a first distortion dE1 is calculated by comparison of the first test image with the original image, and a second distortion dE2 is calculated by comparison of the second test image with the original image. The distortions are calculated as Peak Signal to Noise Rations (PSNR) such as described by David Salomon in his book entitled "Data Compression, The Complete Reference"

4th edition 2007, Springer. The first distortion dE1 allows appreciating in how far the deterioration of the image—for instance by embedding of the CLUT with the image—reduces the image quality. The second distortion dE2 allows appreciating in how far the deterioration of the CLUT impacts on the image quality.

However, the compression data rate of the image and the resulting image quality have to be taken into account, too. Therefore, a global distortion dE is calculated as a weighted summation of the first distortion dE1 with the second distortion dE2, and a conjoint bit rate R is calculated as a summation of the first bit rate R1 with the second bit rate R2.

The two distortions dE1 and dE2 are averaged giving dE=0.5 dE1+0.5 dE2 assuming that both distortions are decorrelated. The averaging can also be weighted, for example dE=0.75 dE1+0.25 dE2, if image compression quality is more important for a given application that image color quality. This is useful since reduced compression quality leads to structured noise while reduced color transform quality leads to spatially smooth color errors.

Then, a test is applied to determine if the global distortion dE and the conjoint bit rate R correspond to a predetermined trade-off or not.

This trade-off can be determined for example as follows. For example, when calculating first and second test image several times with different rates for the color transform, a tradeoff between data rate R and image quality dE can be analyzed and optimized for instance in the sense of the rate-distortion theory, i.e. looking for the lowest rate at lowest distortion. This is done for instance in the following way. First, from all calculations of dE and R, the largest value of dE, named dEmax, and the largest value of R, named Rmax, are determined. Then one of the calculations is chosen as the best such that $(dE/dEmax-1)^2+(R/Rmax-1)^2$ is maximum ensuring that the chosen calculation of dE, R is farthest away from the maximum (worst solution) in a normalized rate-distortion diagram. Such a choice of dE, R corresponds to a determined trade-off between data rate R and image quality dE. Other way to determine a trade-off between data rate R and image quality dE can be used to implement the invention.

If the predetermined trade-off is not met, new values of the first bit rate R'1 and/or of the second bit rate R'2 are chosen such that the new conjoint bit rate R' evaluated from a summation of this new first bit rate R'1 with the new second bit rate R'2 is inferior to the previous conjoint bit rate R, and another loop of the previous steps above is launched with this new first bit rate R'1 and/or this new second bit rate R'2, starting, as above, with the generation of a new deteriorated image having this new first bit rate R'1 and/or a new deteriorated CLUT having a new second bit rate R'2.

If the predetermined trade-off between the evaluated conjoint bit rate R and the evaluated global distortion dE is met, then a final conjoint bit rate $R_f$ associated with this trade-off is determined. Note that the final conjoint bit rate $R_f$ may correspond to the conjoint bit rate R' of the last iteration or loop above, or may correspond to the conjoint bit rate of a previous iteration as it may give a best trade-off compared to the last iteration. In any case, this final conjoint bit rate $R_f$ would correspond anyway to a conjoint bit rate of an iteration already performed, when it was associated in this iteration with a value of a first bitrate and with a value of a second bitrate, which are then considered respectively as a final first bit rate $R_f1$ and as a final second bit rate $R_f2$.

In the final step of the method of embedding, using known software embedding means included in the server, the deteriorated image associated with this final first bit rate $R_f1$ is embedded with the deteriorated color transform associated with this final second bit rate $R_f2$. This deteriorated image is considered as the optimal deteriorated image, and this deteriorated color transform is considered as the optimal deteriorated color transform.

Then, the transmitter sends to the terminal the optimal deteriorated image with the optimal deteriorated color transform as embedded together.

When receiving the optimal deteriorated image together with the optimal deteriorated CLUT, the terminal separates the optimal deteriorated image from the optimal deteriorated CLUT, and applies the optimal deteriorated CLUT to the optimal deteriorated image in order to get a color transformed image.

If the terminal is a gateway connected to a TV set, the terminal then sends the color transformed image to the TV set for display.

The advantages provided by embodiments of the invention are notably:

an optimization of image quality as displayed on the TV set, i.e. after color transformation, including the minimization of the distortion caused by embedding a color transform with the image for transmission.

an optimization of color transform precision, i.e. an optimization of image quality gained by applying the color transform.

a control of rate for the transmission, because the embedment is performed through an optimization of the amount of information of the image that can be replaced by information related to the color transform.

The main embodiment of the method according to the invention can be implemented more specifically according to different variants.

Figure 2:
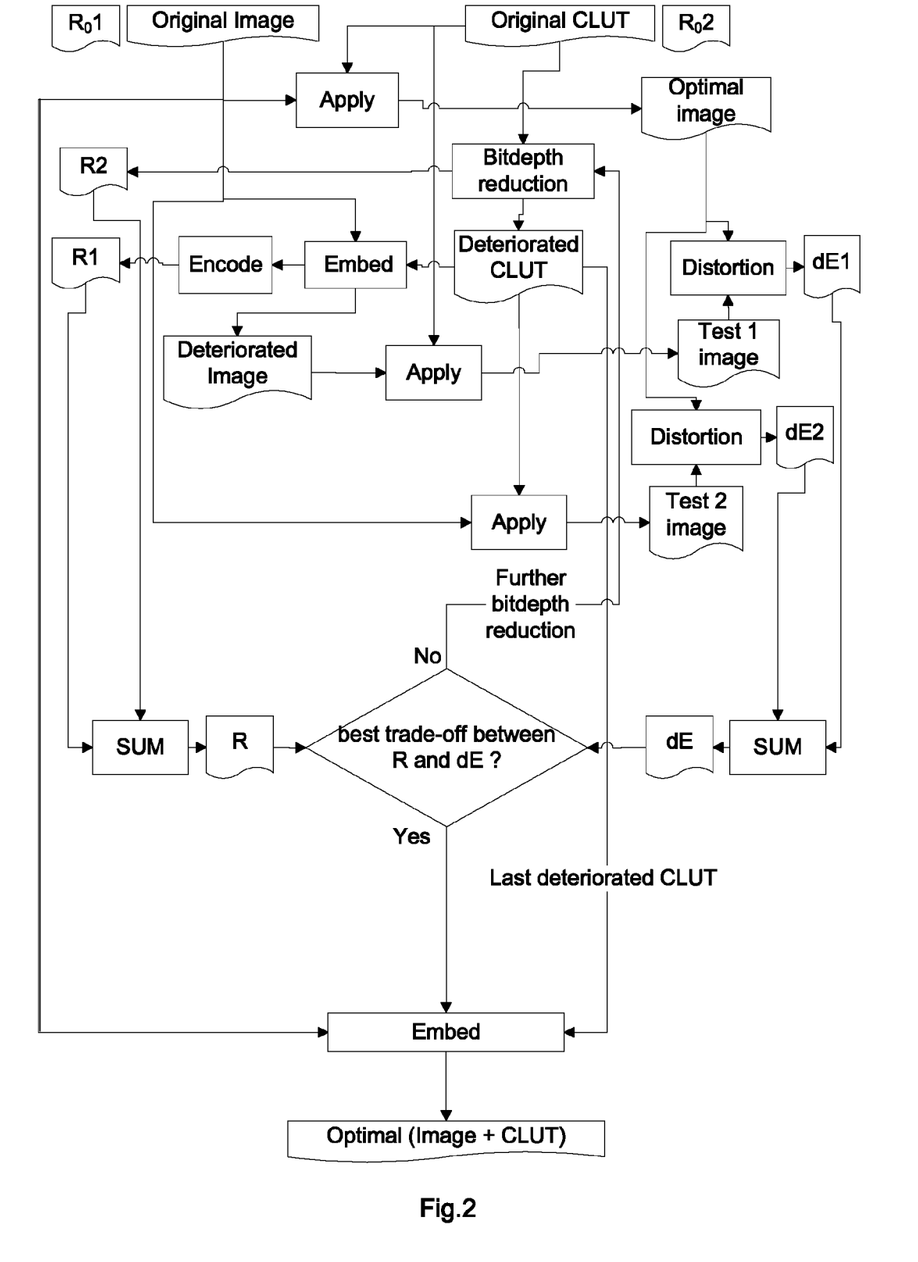
FIG. 2 is a diagram illustrating a first variant of the method shown on FIG. 1.

A first variant is illustrated on the diagram of FIG. 2 where only the bitdepth R2 of the deteriorated CLUT is reduced from one iteration of the process to the next one and where the bitdepth R1 of the image which is deteriorated by compression is kept constant. In this variant, at each iteration of the process, the deteriorated image results from the embedding of the corresponding deteriorated CLUT into the original image and the bit rate R1 of this deteriorated image results from an encoding (compression) of this deteriorated image. Several compression principles could be implemented for this encoding. If the well-known variable bitrate principle is used, an aimed distortion dE1_aim is defined and the encoding process adapts itself to this requirement, resulting to a bitrate R1 and to a distortion dE1 close to the aimed distortion dE1_aim. The aimed distortion depends on the application depending on image content and bitrate constraints. If the fixed bitrate principle is used, R1 is fixed and given, while dE1 results from encoding such as shown in FIG. 2. The bitrate depends on the application. For example for HDTV images, a rate R1 of 1 MB/s is a good choice. Any other known data encoding method can be used. After each iteration which does not pass the "trade-off" test above, another deteriorated CLUT associated with a second bit rate R'2<R2 is generated, such that the bit rate R'2 associated with this other deteriorated CLUT is inferior to R2, and then, another iteration is launched until global distortion dE and conjoint bit rate R values are obtained that met the predetermined trade-off requirement of the test. Note that, if R1 is either invariant over all iterations (constant bitrate encoding principle) or comes out the encoding process (variable bitrate encoding principle), the variation R'−R of the conjoint bit rate from one iteration to a new one corresponds to either the variation R'2−R2 of the second bit rate, or to the variation R'2−R2+R'1−R1, respectively.

Figure 3:
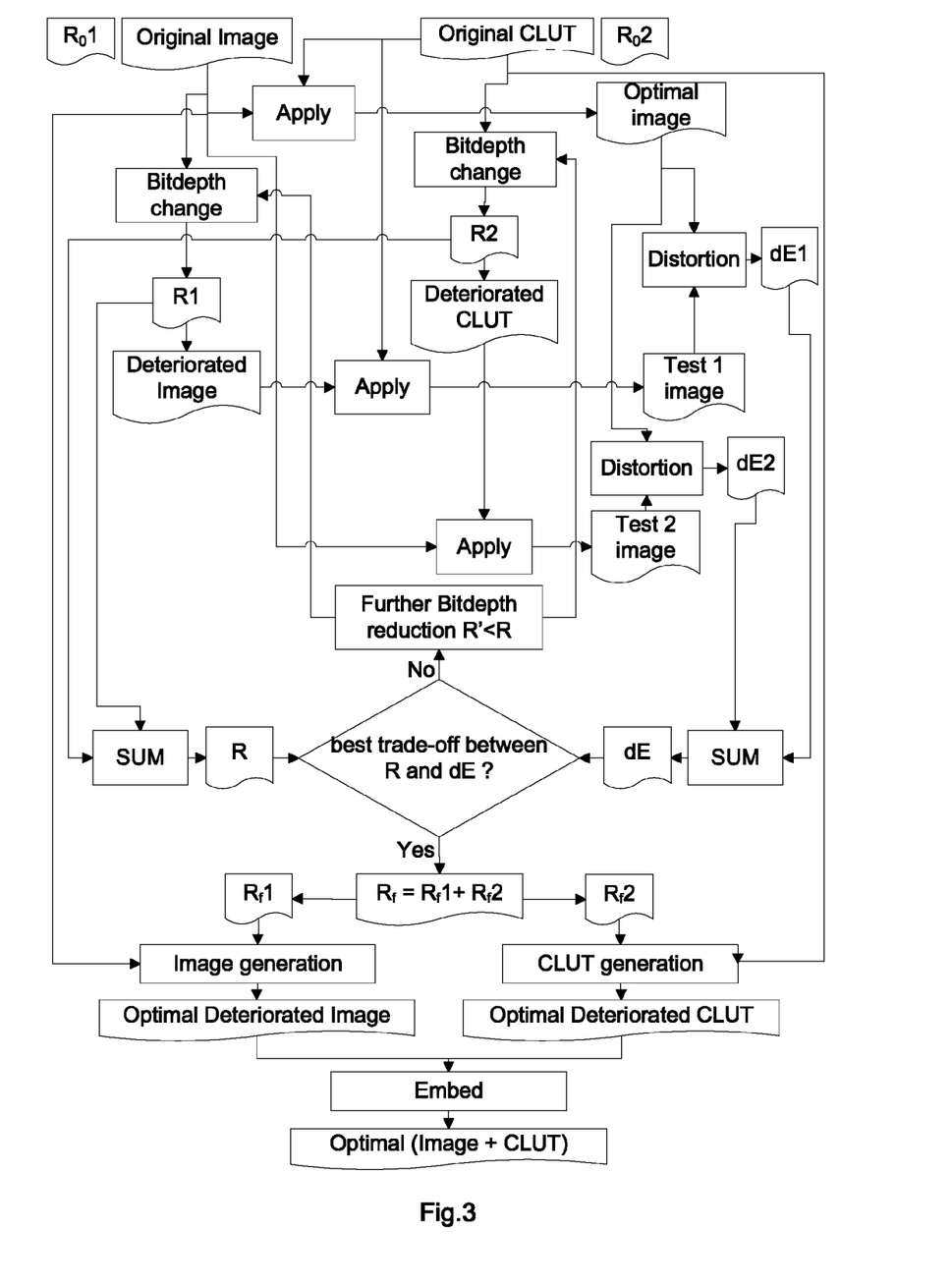
FIG. 3 is a diagram illustrating a second variant of the method shown on FIG. 1.

A second variant is illustrated on the diagram of FIG. 3. In this variant, at each iteration of the process:

the bit depth N of the color coordinates is reduced by one, resulting in a new bit depth N'=N−1. The bit depth R'1 for the generation of the deteriorated image being equal to the product K×M×N' is then reduced to one in comparison with the bit depth R1 of the previous iteration.

the bit depth Q of the entries of the CLUTs representing the deteriorated color transforms is reduced by one, resulting in a new bit depth Q'=Q−1. The bit depth R'2 for the generation of the deteriorated CLUTs being equal to the product P×M×Q' is then reduced to one in comparison with the bit depth R2 of the previous iteration.

Although the illustrative embodiments of the invention have been described herein with reference to the accompanying drawings, it is to be understood that the present invention is not limited to these precise embodiments, and that various changes and modifications may be effected therein by one of ordinary skill in the pertinent art without departing from the invention. All such changes and modifications are intended to be included within the scope of the present invention as set forth in the appended claims.

It is to be understood that the invention may be implemented in various forms of hardware, software, firmware, special purpose processors, or combinations thereof. The invention may be notably implemented as a combination of hardware and software. Moreover, the software may be implemented as an application program tangibly embodied on a program storage unit. The application program may be uploaded to, and executed by, a machine comprising any suitable architecture.

The invention claimed is:

1. Method of embedding at least one original image with at least one original color transform, comprising:
   A/ generation, from at least said one original image, of a deteriorated image associated with a first bit rate,
   B/ generation, from at least said one original color transform, of a deteriorated color transform associated with a second bit rate,
   C/ application of said at least one original color transform to said deteriorated image to obtain a first test image,
   D/ application of said deteriorated color transform to said original image to obtain a second test image,
   E/ obtaining a first distortion by comparison of the first test image with the original image,
   F/ obtaining a second distortion by comparison of the second test image with the original image,
   G/ obtaining a conjoint bit rate from a summation of the first bit rate with the second bit rate,
   H/ obtaining a global distortion from a summation of the first distortion with the second distortion, said summation being optionally weighted, then, a tradeoff between the conjoint bit rate and the global distortion being determined,
   in the case where said trade-off is met, determining a final conjoint bit rate associated with said trade-off,
   otherwise in the case where said trade-off is not met, selecting new values of said first bit rate and/or said second bit rate such that a new conjoint bit rate obtained from a summation of said new first bit rate, if any, or previous first bit rate, if no new first bit rate is selected, with said new second bit rate, if any, or previous second bit rate, if no new second bit rate is selected, is inferior to the previous conjoint bit rate, and repeating a loop of steps A/ to H/ with said new first bit rate and/or said new second bit rate,
   when said final conjoint bit rate associated with said trade-off is determined, inferring the values of the final first bit rate and of the final second bit rate such that the summation of the final first bit rate and of the final second bit rate corresponds to said final conjoint bit rate from a previous loop of steps A/to H/, and embedding the at least one deteriorated image associated with said final first bit rate from said previous loop with the deteriorated color transform associated with said final second bit rate from the same previous loop.

2. Method of embedding according to claim 1 wherein said color transforms are Color Look Up Tables (CLUT).

3. Method of embedding according to claim 1 wherein said generation of a deteriorated color transform is obtained by reducing the bitdepth of the original color transform.

4. Method of embedding according to claim 1 wherein said generation of a deteriorated image is obtained by embedding said original image with said deteriorated color transform.

5. Method of embedding according to claim 4 wherein said first bit rate associated with said deteriorated image results from an encoding of said deteriorated image.

6. Method of embedding according to claim 1 wherein said generation of a deteriorated image is obtained by reducing the bitdepth of the original image.

7. System for embedding at least one original image with at least one original color transform, comprising:
   an image generator configured to generate, from at least said original image, a deteriorated image associated with a first bit rate,
   a color transform generator configured to generate, from at least said original color transform, a deteriorated color transform associated with a second bit rate,
   a module configured to apply said original color transform to said deteriorated image resulting in a first test image,
   a module configured to apply said deteriorated color transform to said original image resulting in a second test image,
   a module configured to evaluate a first distortion by comparison of the first test image with the original image,
   a module configured to evaluate a second distortion by comparison of the second test image with the original image,
   a module configured to evaluate a conjoint bit rate from a summation of the first bit rate with the second bit rate,
   a module configured to evaluate a global distortion from a weighted summation of the first distortion with the second distortion,
   a module configured to determine the final conjoint bit rate associated with the best trade-off when a predetermined trade-off between said conjoint bit rate and said global distortion is met,
   a module configured to select new values of said first bit rate and/or said second bit rate such that a new conjoint bit rate evaluated from a summation of this new first bit rate with the new second bit rate is inferior to the previous conjoint bit rate, when said predetermined trade-off is not met,
   a module configured to redirect to the image generator and to the color transform generator when said predetermined trade-off is not met, with said new first bit rate and said new second bit rate,
   a module configured to infer the values of the final first bit rate and of the final second bit rate the summation of which corresponds to said final conjoint bit rate when a predetermined trade-off between said conjoint bit rate and said global distortion is met, a module configured to embed the at least one deteriorated image associated with this final first bit rate with the at least one deteriorated color transform associated with this final second bit rate.

\* \* \* \* \*